United States Patent [19]
Foster et al.

[11] 3,808,602
[45] Apr. 30, 1974

[54] BILLING TAPE RECORDER CONVERSION UNIT FOR A WATTHOUR METER

[75] Inventors: Dennis L. Foster, Piqua; James D. Hoeffel, Centerville, both of Ohio; Eugene W. Rice, Crawfordsville, Ind.

[73] Assignee: Dayton Electronic Products Company, Dayton, Ohio

[22] Filed: Feb. 12, 1973

[21] Appl. No.: 331,528

[52] U.S. Cl.......... 346/74 M, 324/103, 346/14 MR
[51] Int. Cl. .......................................... G01d 15/06
[58] Field of Search...... 346/74 M, 14 MR, 17, 145; 324/103, 113; 317/107, 108, 109, 110, 111

[56] References Cited
UNITED STATES PATENTS

| | | | |
|---|---|---|---|
| 3,422,441 | 1/1969 | Chapsky | 346/74 M |
| 3,673,607 | 6/1972 | Hoeffel | 346/74 M |
| 3,524,194 | 8/1970 | Vogtlin | 346/145 |
| 3,189,821 | 6/1965 | Petzinger | 324/103 R |
| 3,103,401 | 9/1963 | Daniels | 346/74 M |

Primary Examiner—James W. Moffitt
Assistant Examiner—Jay P. Lucas
Attorney, Agent, or Firm—Biebel, French & Bugg

[57] ABSTRACT

An existing cylindrical housing for a chart recorder is utilized as the housing for a magnetic tape recording unit. The cylindrical housing includes a terminal block, three mounting spacers, six threaded cover plate fastening bosses and a housing cover. The magnetic tape recorder unit is of circular configuration having a size and shape to be received in the housing without requiring the removal of the three mounting spacers, while using one spacer for back support. The unit includes mounting holes oriented with four of the six existing cover plate fastening bosses. A cable assembly connects the tape recorder to the existing terminal block for direct recording of power usage.

2 Claims, 2 Drawing Figures

BILLING TAPE RECORDER CONVERSION UNIT FOR A WATTHOUR METER

BACKGROUND OF THE INVENTION

In the measurement of electrical power consumption, the usual watt-hour meter employed has a rotating disc, the speed of rotation of which is a function of the power consumed. Connected to the disc are dial indicators to enable a meter reader to ascertain visually the total power consumed since the last meter reading. Some watt-hour meters also include electrical switch contacts to produce electrical pulses, the spacing of which is a function of power consumption.

The billing rates for electrical power consumption vary, depending upon the time of day, or the day of the week, and therefore the power generating companies need information on the amount of power consumed during different periods of the day. One device used to record this information is a chart recorder having a circular chart rotated by a motor and a pen moved through incremental distances upon the receipt of the pulses from the watt-hour meter. The pen is reset periodically upon the receipt of a timing pulse generated internally within the recorder.

These chart recorders are mounted in circular housings installed at convenient locations to allow removal of the charts at periodic intervals. Analysis of the markings on the charts would then provide information regarding the amount of power consumed during each period of the day, and the total bill to the customer would then be calculated from this information.

Billing tape recorders have been in use for some time wherein a magnetic tape cartridge is used to record pulses representing a measured parameter, such as kilowatt hours, KVA, current squared, along with pulses representing time so that billing can be calculated based on the rate of power consumption at any particular time during the day. For more detailed information on these billing tape recorders, reference is made to U.S. Pat. Nos. 3,148,329 and 3,673,607.

The installation of a billing tape recorder usually involves the mounting of a housing for the equipment, and connection to a watt-hour meter. Since many thousands of chart recorders are already in existance and are wired to the measuring instrument, the costs of installing a billing tape recorder could be reduced if the existing recorder housing were used.

SUMMARY OF THE INVENTION

This invention relates to a billing tape recorder so designed as to be installed directly in existing circular recorder housings. This invention therefore reduces the cost of installing modern billing tape recorders.

The circular case most commonly used is known as a G-9 case, and it includes a terminal block mounted at the lower part of the case having connections to an existing measuring device, usually a watt-hour meter. The case includes a cover which is hinged at one side to allow access to the interior thereof. A plurality of mounting bosses are found evenly spaced around the inside edge of the case, and were formerly used to fasten a cover plate over the original mechanism. Once the old mechanism is removed, several of these bosses are used in the installation of the billing tape recorder. Three mounting spacers or studs are found within the case, and one of them is fitted with a spacer to provide back support for the recorder. The recorder is so designed that the other spacers need not be removed.

Field conversion from the previous chart recorder to the billing tape recorder described above can be accomplished within 30 minutes, requires no rewiring of the meter, and effects significant savings in installation time and thus lowers the initial cost of installation of the billing tape recorder.

Accordingly, it is an object of this invention to provide a conversion unit for use in existing housings having a circular configuration and a terminal block connected to existing measuring devices which is so configured that it utilizes the existing studs and mounting devices in the housing when the cover is opened and which has a cable assembly adapted to be connected to the existing terminal block for direct recording of pulses from a measuring device.

Other objects and advantages of the invention will be apparent from the following description, the accompanying drawings and the appended claims.

DESCRIPTION OF THE PREFERRED EMBODIMENT

Figure 1:
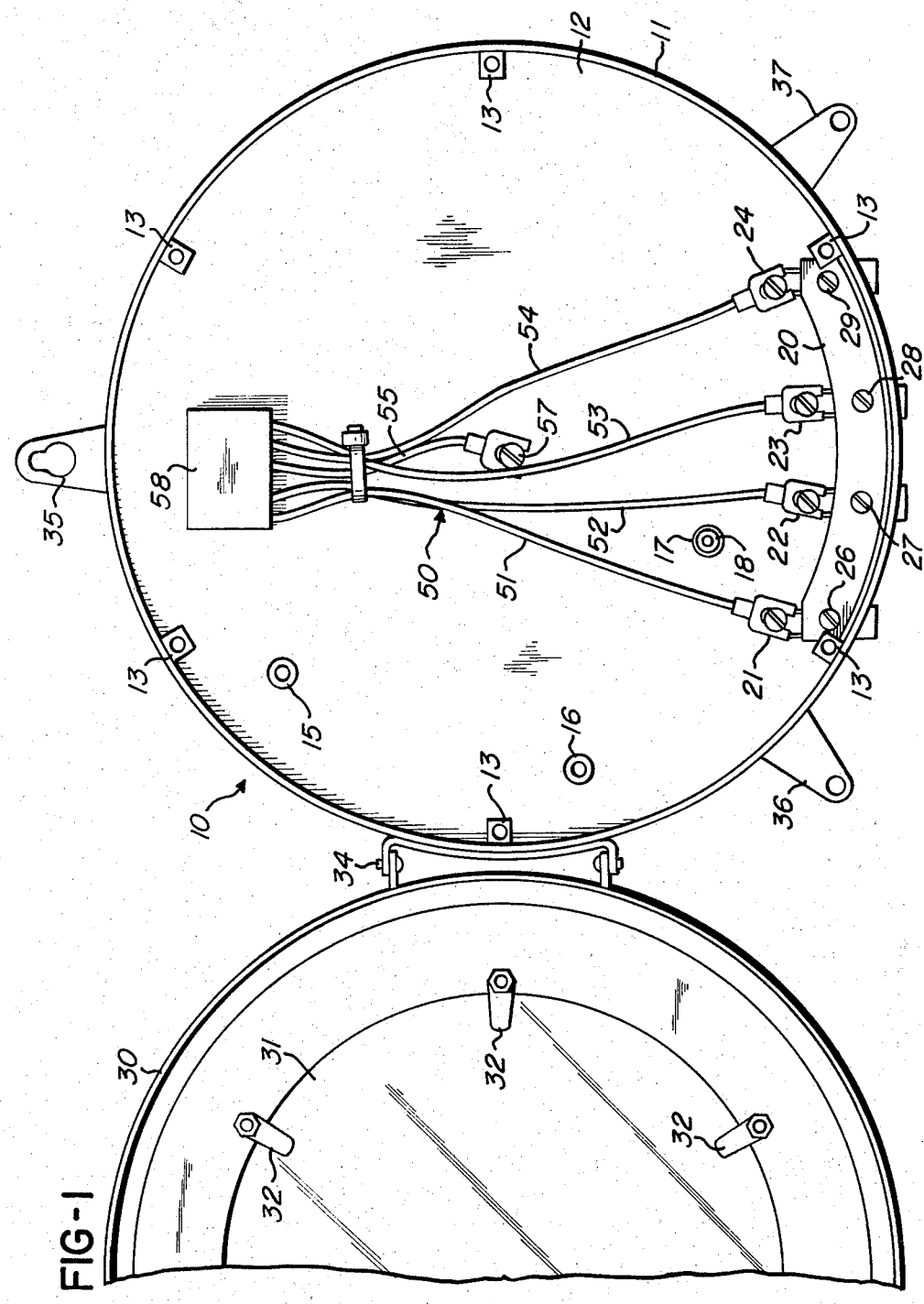
FIG. 1 is an elevational view of a G-9 recorder housing with a wiring harness shown connected.

Reference is now made to the drawings which show a preferred embodiment of the invention. In FIG. 1, a G-9 recorder housing is shown generally at 10 and includes a cylindrical case 11 having a back 12 and six circumferentially spaced bosses 13, each having a threaded hole to receive the screws originally used to mount a cover plate to a chart recorder mechanism. Also located within the housing 10 are three permanent spacers or studs 15, 16 and 17, each having a centrally located threaded opening. The lowermost stud 17 is provided with a spacer 18, the purpose of which will be described later.

Mounted within the housing at the lowermost portion is a terminal block 20 having four terminals 21, 22, 23 and 24. Terminals 21 and 22 are connected to 120 volts and terminals 23 and 24 are connected to a switch within a watt-hour meter. The terminal block 20 also includes four screws 26-29 connected to the terminals 21-24, respectively.

The case may be closed by means of a door 30 having a glass window 31 secured to the door by retaining members 32. The door is mounted to the housing 10 by a hinge 34.

The housing 10 may be mounted to a wall or other vertical support member by means of three radially extending lugs 35, 36 and 37. When the housing is used in this invention, it generally will not be removed from its mounted location when the billing tape recorder is installed.

Figure 2:
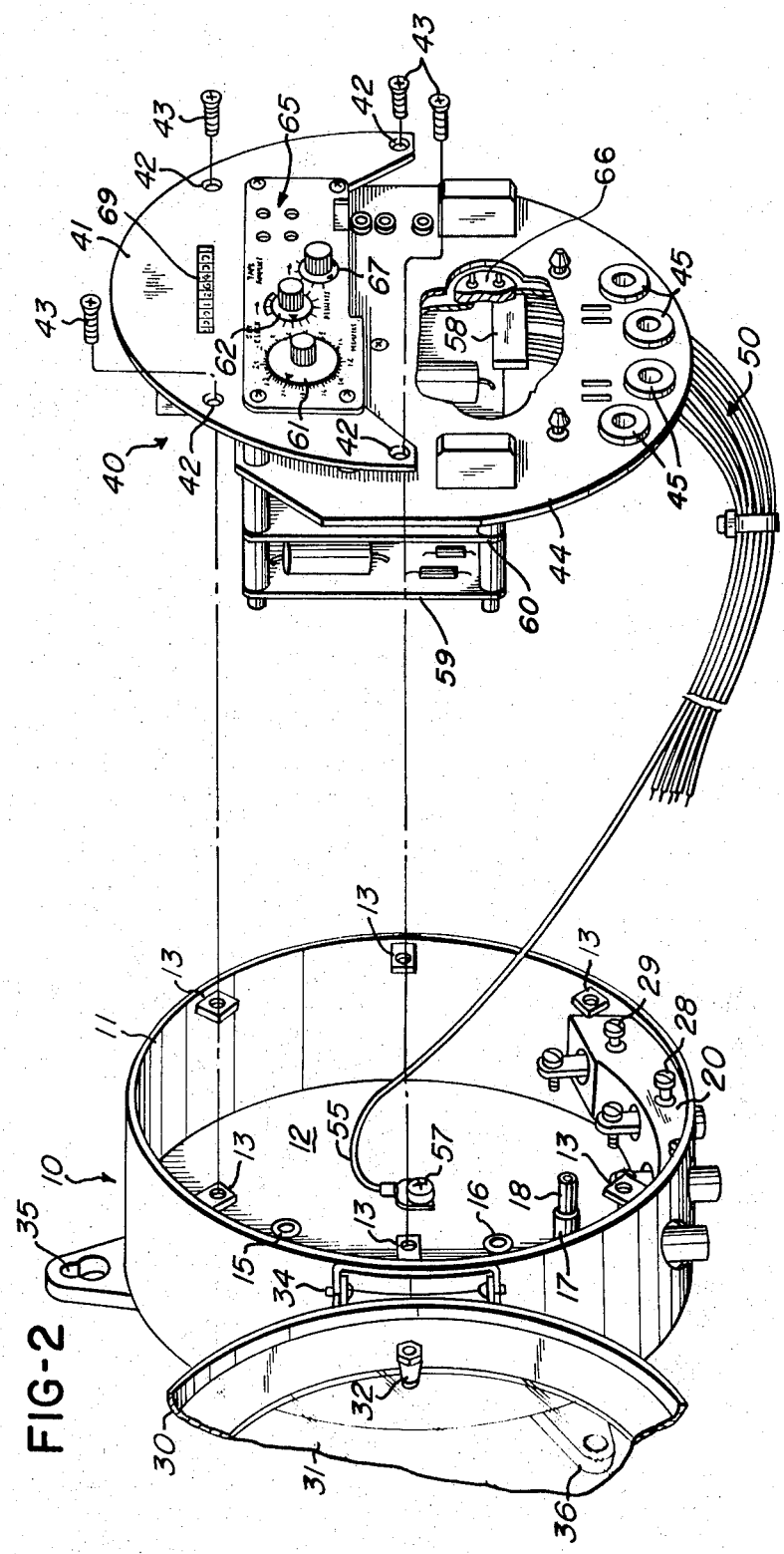
FIG. 2 is a perspective, exploded view showing a billing tape recorder to be installed in a G-9 recorder housing.

Referring now to FIG. 2, a billing tape recorder 40 is shown having a circular configuration adapted to be received into the cylindrical case 11 and having a depth permitting closure of the cover 30. The recorder includes an upper, semi-circular plate 41, and around the periphery of this plate are four screw holes 42 which are aligned with the four uppermost bosses 13 of the case 11. Screws 43, retained when the chart recorder was removed from the case, serve to hold the billing tape recorder in the housing. The spacer 18 abuts a back plate 44 of the recorder to provide additional support. The plate 44 is also provided with four openings 45 each insulated with grommets and so spaced to receive screws 26-29.

A cable assembly 50 includes five color coded wires 51-55 having terminals at the end thereof, four of which are connected to terminals 21-24, and the fifth is connected to a grounding lug 57 at the back of the housing 10. The assembly also includes an edge connector 58 which fits a designated edge of printed circuit board 59 of the billing tape recorder. Plate 60 supports a tape transport mechanism, not shown. Both printed circuit board 59 and plate 60 are of such size and shape, and are so located on the plate 44 that they clear the studs 15, 16 and 17.

The billing tape recorder 40 is designed to replace directly existing electromechanical units presently housed in the G-9 case according to the following replacement procedure. The power is first turned off to the G-9 meter and the case is opened and the six screws around the inside edge of the case are removed. Four of these screws 43 are retained to mount the billing tape recorder. All of the wires are disconnected from the terminal block 20 although the terminal block is not removed from the case.

The electromechanical unit is removed from the case exposing the three permanent studs 15, 16 and 17. To the lowermost stud 17 is added a spacer 18 to provide a back support for the plate 44 of the billing tape recorder.

The cable assembly 50 is then installed with the terminal ends of wires 51-54 connected to appropriate terminals 21-24 and wire 55 connected to the back plate 12. The connector 58 is then attached to the billing tape recorder 40, the tape recorder body is inserted into the housing 10 and the four screws 43 are installed to hold it in place.

Once the installation is checked to insure freedom of operation, the correct time is set on hour knob 61 and minute knob 62. The operation of a light emitting diode indicator 65 is checked for operation. Finally a tape cartridge is inserted and the tape manually advanced through tape drive mechanism 66 by rotation of knob 67 until a silver marker in the tape has passed under recording heads located between plates 41 and 44. A counter 69 is included to provide an electromechanical back up for the tape recorder.

Conversion time from previous electromechanical recording devices to the billing tape recorder constructed according to this invention usually takes under 30 minutes. If the housing were empty of its electromechanical recorder, installation of the tape recorder could take less than fifteen minutes. Thus, this invention not only saves installation time and lowers the cost of installing billing tape recorders, but it also lowers the cost of the new tape recorder since a new housing is not required.

While the form of apparatus herein disclosed constitutes a preferred embodiment of the invention, it is to be understood that the invention is not limited to this precise form of apparatus, and that changes may be made therein without departing from the scope of the invention which is defined in the appended claims.

What is claimed is:

1. In an existing housing for a power consumption recorder, said housing including a back, a circular shell, a plurality of mounting bosses spaced around the inside edge of said shell, a plurality of mounting spacers extending outwardly from said back, a terminal block having outwardly extending screws, and a hinged cover, the improvement comprising
a tape recorder mechanism having a generally circular configuration and a size to be received into said housing without requiring removal of said mounting spacers, and including means defining mounting holes in alignment with some of said mounting bosses for installation thereon, and other means defining openings through which said outwardly extending screws of said terminal block may pass.

2. The recorder of claim 1 further including a spacer attached to one of said mounting spacers to provide back support for said recorder mechanism.

* * * * *